United States Patent
Liu et al.

(10) Patent No.: US 12,209,926 B2
(45) Date of Patent: Jan. 28, 2025

(54) RESIDUAL STRESS MEASUREMENT METHOD OF CURVED SURFACE BLOCK

(71) Applicant: METAL INDUSTRIES RESEARCH & DEVELOPMENT CENTRE, Kaohsiung (TW)

(72) Inventors: Zong Rong Liu, Kaohsiung (TW); Hsiu An Tsai, Kaohsiung (TW)

(73) Assignee: METAL INDUSTRIES RESEARCH & DEVELOPMENT CENTRE, Kaohsiung (TW)

(*) Notice: Subject to any disclaimer, the term of this patent is extended or adjusted under 35 U.S.C. 154(b) by 241 days.

(21) Appl. No.: 18/059,962

(22) Filed: Nov. 29, 2022

(65) Prior Publication Data

US 2023/0088293 A1 Mar. 23, 2023

Related U.S. Application Data

(63) Continuation-in-part of application No. 17/126,385, filed on Dec. 18, 2020, now Pat. No. 11,543,310.

(51) Int. Cl.
*G01N 23/207* (2018.01)
*G01L 1/25* (2006.01)
*G01L 5/00* (2006.01)

(52) U.S. Cl.
CPC ............ *G01L 5/0047* (2013.01); *G01L 1/25* (2013.01); *G01N 23/207* (2013.01); *G01N 2223/1016* (2013.01)

(58) Field of Classification Search
None
See application file for complete search history.

(56) References Cited

U.S. PATENT DOCUMENTS

2013/0044864 A1* 2/2013 Wang .................. G01L 1/25
378/71
2019/0094160 A1* 3/2019 Sunder ............. G01N 23/20016

FOREIGN PATENT DOCUMENTS

| JP | 5954642 B1 | 7/2016 |
| JP | 2017187352 A | 10/2017 |
| TW | I669501 B | 8/2019 |

* cited by examiner

*Primary Examiner* — David P Porta
*Assistant Examiner* — Mamadou Faye
(74) *Attorney, Agent, or Firm* — CKC & Partners Co., LLC

(57) ABSTRACT

A residual stress measurement method of a curved surface block includes steps of: locating a point at which a to-be-detected curved surface of a curved surface block has a highest curvature as a to-be-detected point; applying an instrument integrating an X-ray light source and a detector, measuring the to-be-detected point by using an X-ray diffraction theory, and analyzing and calculating, in combination with a $\sin^2 \Psi$ method, a strain value measured by using the instrument; and calculating, in combination with material property measurement data of the curved surface block material, a residual stress by introducing a curved surface block residual stress calculation model.

12 Claims, 3 Drawing Sheets

RESIDUAL STRESS MEASUREMENT METHOD OF CURVED SURFACE BLOCK

RELATED APPLICATIONS

This application is a continuation-in-part (CIP) application of U.S. application Ser. No. 17/126,385, filed on Dec. 18, 2020. The entire disclosure of the above application is hereby incorporated by reference herein.

BACKGROUND

Field of Invention

The present invention relates to a method for measuring a residual stress, and in particular, to a method for measuring a residual stress of a curved surface block.

Description of Related Art

As machining, casting and forging, and die and mold industries develop towards a direction of high value, high precision, and functionality, increasing importance is attached to workpiece lifetime and damage analysis. A residual stress is one of important indicators for lifetime and failure analysis.

The residual stress detection is divided into contact detection and non-destructive detection. A blind-hole method is mainly adopted in common contact residual stress measurement. Under a trend of high-value products and real-time measurement, the blind-hole method is gradually inapplicable. The mainstream non-destructive residual stress measurement is an X-ray diffraction method. However, due to the use of non-contact measurement, a workpiece carrier, material properties, a geometrical shape, and residual stress calculation parameters all have impact on measurement data.

The principle of residual stress measurement of the X-ray diffraction method is that material lattices deformed by the stress and different measurement parameters are introduced with a fitting method to calculate the residual stress. At present, the X-ray diffraction method mainly measures the residual stress on a planar shape of a material, and is not suitable for measuring the residual stress on a curved shape of the material.

However, more and more products are designed with curved shapes, so measurement requirements for the residual stress of a curved surface block are also gradually increased. However, an original analysis model is easily affected by a shape and consequently it is easy to cause a measurement error and numerical distortion.

SUMMARY

The invention provides a residual stress measurement method of a curved surface block. The residual stress measurement method is applied to the measurement of the residual stress on the curved surface of the block.

According to the aforementioned objectives, the present disclosure provides a residual stress measurement method of a curved surface block. The residual stress measurement method of the curved surface block includes steps as follow. Locate a point at which a to-be-detected curved surface of a curved surface block has a highest curvature as a to-be-detected point. Apply an instrument integrating an X-ray light source and a detector. Measuring the to-be-detected point by using an X-ray diffraction theory. Analyze and calculate, in combination with a $\sin^2 \Psi$ method, a strain value measured by using the instrument. Calculate, in combination with material property measurement data of the curved surface block, a residual stress of the to-be-detected curved surface by introducing a mathematical expression 1 of a curved surface block residual stress calculation model as below.

$$\sigma = E\{ + (\varkappa -)\kappa \} \quad \text{[mathematical expression 1]}$$

Where $\sigma$ represents the residual stress, E represents a Young's modulus of the curved surface block, c represents the strain value measured by using the instrument, $h_b$ represents a thickness of the curved surface block, $\kappa$ represents a curvature at the highest point of the to-be-detected curved surface, and $\chi$ represents a diffraction depth.

According to one embodiment of the present disclosure, a locating manner of the to-be-detected point is a manner in which the curved surface block is fixed on a curved-surface fixing platform in combination with the curved-surface fixing platform, and a position of the to-be-detected point is calibrated to keep the to-be-detected point at a horizontal highest point relative to the curved-surface fixing platform.

According to one embodiment of the present disclosure, before the instrument is in combination with the $\sin^2 \Psi$ method, the instrument is applied to scan for obtaining a phase analysis and to select a phase analysis diffraction peak.

According to one embodiment of the present disclosure, in the locating manner of the to-be-detected point, the to-be-detected point is located on a center reference line of the curved-surface fixing platform.

According to one embodiment of the present disclosure, the curved-surface fixing platform includes a slot for placing a to-be-detected piece, a locking device, and a leveling device. The slot for placing a to-be-detected piece is configured to accommodate the curved surface block. The locking device is configured to lock the curved surface block in the slot for placing a to-be-detected piece. The leveling device is configured to keep the to-be-detected point at a horizontal highest point in combination with a fastening force of the locking device.

According to one embodiment of the present disclosure, the locking device is a screw structure capable of screwing a front end out of or into a side wall of the slot for placing a to-be-detected piece, to butt and fix or release the curved surface block.

According to one embodiment of the present disclosure, the locking device includes multiple screw rods. The screw rods are respectively located at two sides of the center reference line of the curved-surface fixing platform.

According to one embodiment of the present disclosure, the leveling device is a screw structure capable of screwing a front end out of or into a bottom of the slot for placing a to-be-detected piece, to lift up or lower the curved surface block.

According to one embodiment of the present disclosure, the leveling device includes multiple adjusting rods. The adjusting rods are respectively located at two sides of the center reference line of the curved-surface fixing platform.

According to one embodiment of the present disclosure, the X-ray light source and the detector are respectively located at two sides relative to the to-be-detected point.

According to one embodiment of the present disclosure, the X-ray light source is fixed.

According to one embodiment of the present disclosure, the X-ray light source is moved along a path. The detector is moved along the path and faces toward an orthogonal direction relative to an incident direction of the X-ray light source.

The present disclosure has at least the following characteristics: a measurement model provided in the present disclosure may be applicable to measuring the residual stress of the curved surface block, to resolve a problem that the existing measurement technology cannot precisely quantize the residual stress of the curved surface block, and other problems. By using the measurement model, the fixing platform, and the instrument integrating the X-ray light source and the detector provided by the present disclosure, a measurement error can be reduced, curved surface impact factors can be reduced, geometrical features can be effectively controlled, and a measurement error caused by deviation of a residual stress measurement point on the curved surface can be eliminated. Due to a characteristic of the $\sin^2\Psi$ method used in the present disclosure to measure the residual stress, the method can be used to reduce the measurement error for enhancing measurement accuracy.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
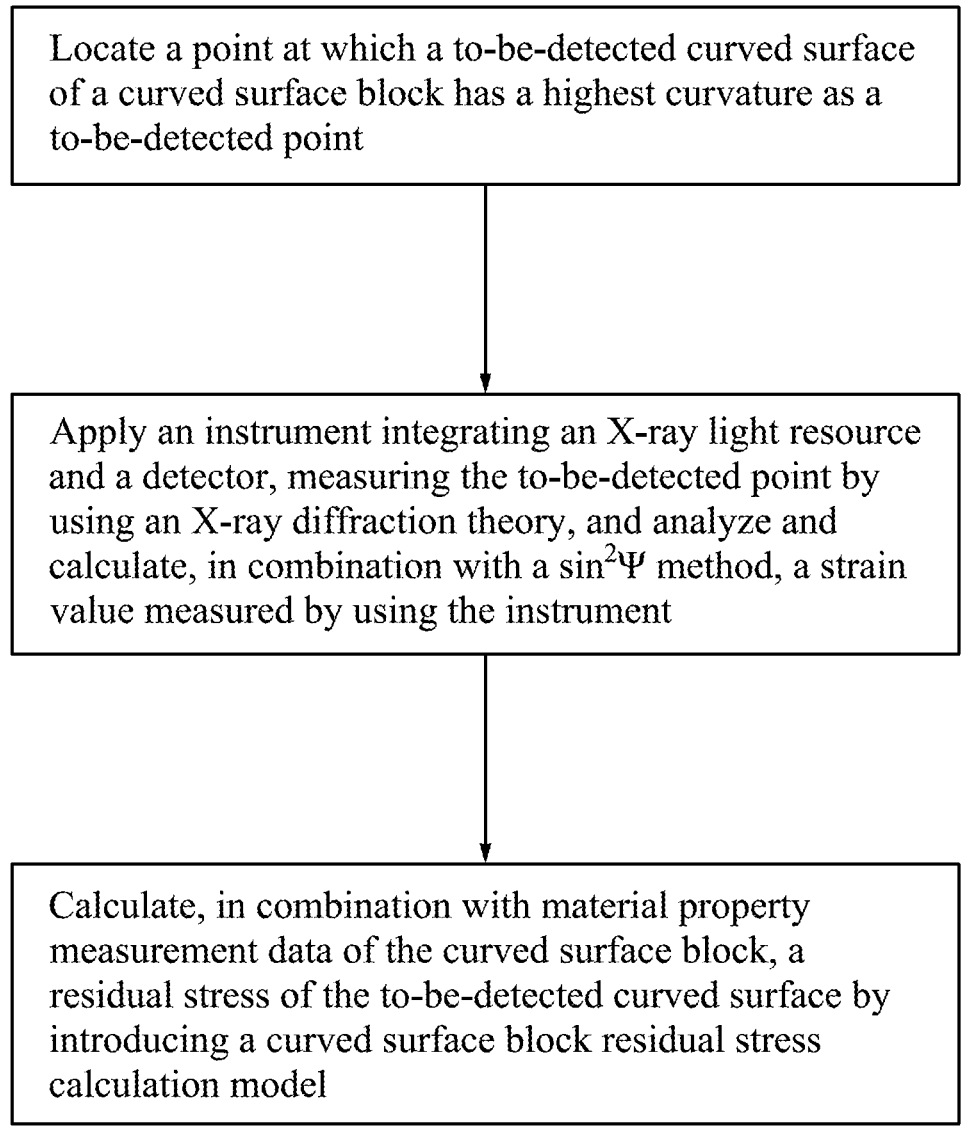
FIG. 1 is a flowchart of a residual stress measurement method of a curved surface block according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
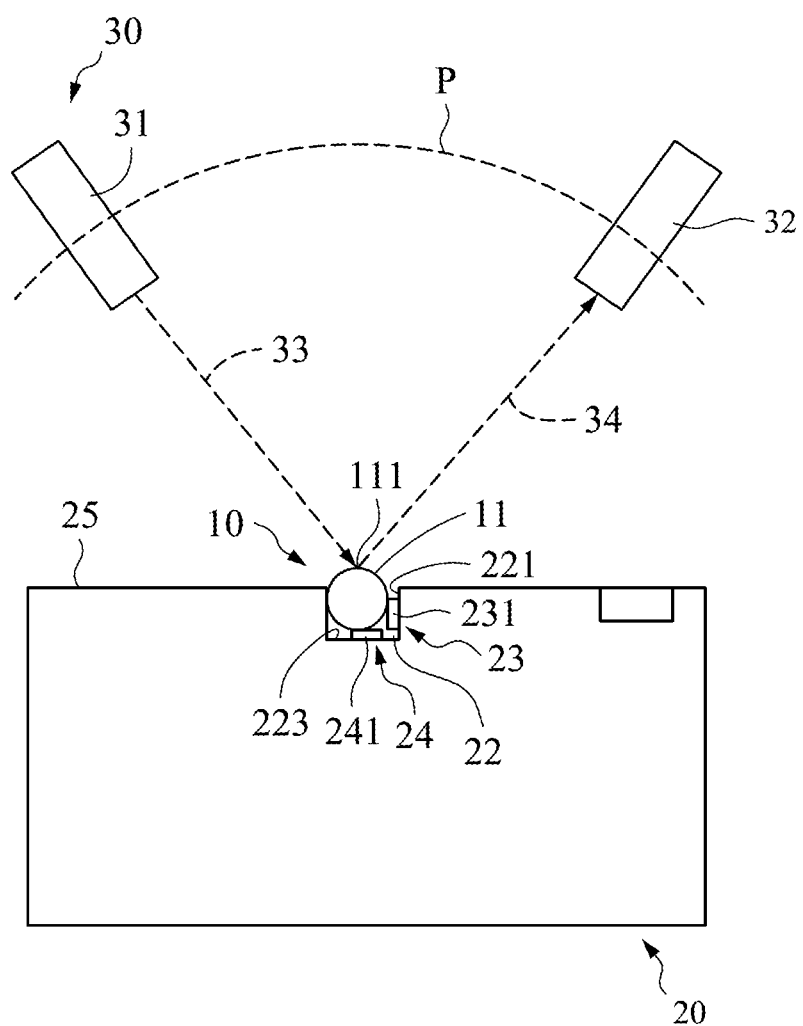
FIG. 2 is a schematic diagram of a detection manner of a residual stress measurement device for measuring a residual stress of a curved surface block according to an embodiment of the present invention.

Referring to FIG. 1 and FIG. 2, in this embodiment, a residual stress measurement method of a curved surface block for measuring a residual stress of the curved-surface block includes step S10 to step S30 as follows:

Step S10. Locate a point at which a to-be-detected curved surface 11 of a curved surface block 10 has a highest curvature as a to-be-detected point 111, as shown in FIG. 2. The curved surface block 10 may be a block of a round rod type having a same curvature, or may be a block whose surface has a plurality of curvatures. If the curved surface block 10 is in a small size, a curved-surface fixing platform 20 described below is used to locate the curved surface block 10, as shown in FIG. 2.

Step S20. Apply an instrument 30 integrating an X-ray light source 31 and a detector 32, irradiate the to-be-detected point 111 according to an X-ray diffraction theory with an X-ray 33 from the X-ray light source 31, receive and measure a diffracted light 34 of the X-ray 33 by the detector 32, and analyze and calculate, in combination with a $\sin^2\Psi$ method, a strain value ε measured by using the instrument 30. Furthermore, apply the instrument 30 to scan for obtaining a phase analysis and to select a phase analysis diffraction peak, and then the instrument 30 is in combination with the $\sin^2\Psi$ method to measure the strain valve.

Step S30. Calculate, in combination with material property measurement data of the curved surface block 10, for example, a diffraction depth χ of the X-ray 33, a Young's modulus E of the curved surface block 10, a thickness $h_b$ of the curved surface block 10, and a curvature κ at the highest point on the to-be-detected curved surface 11 of the curved surface block 10, a residual stress a of the to-be-detected curved surface 11 by introducing a curved surface block residual stress calculation model, that is, a mathematical expression 1 as below.

$$\sigma = E\left\{\frac{\varepsilon(h_{b-X})}{h_b} + \left(X - \frac{-h_b^2 + 2_Xh_b}{2(h_{b-X})}\right)\kappa\right\} \quad \text{[mathematical expression 1]}$$

Referring to FIG. 2, the X-ray light source 31 and the detector 32 are respectively located at two sides relative to the to-be-detected point 111. The X-ray light source 31 is fixed or is moved along a path P. If the X-ray light source 31 is moved, the detector 32 is moved along the path P and faces toward an orthogonal direction relative to an incident direction of the X-ray light source 31. In other words, the path P is orthogonal to the incident direction of the X-ray 33, and is also orthogonal to the orthogonal direction of the X-ray 33. Therefore, the detector 32 can receive the diffracted light 34.

In some embodiments, a locating manner of the to-be-detected point 111 is a manner in which the curved surface block 10 is fixed on a curved-surface fixing platform 20 in combination with the curved-surface fixing platform 20, and a position of the to-be-detected point 111 is calibrated to keep the to-be-detected point 111 at a horizontal highest point relative to the curved-surface fixing platform 20.

Figure 3:
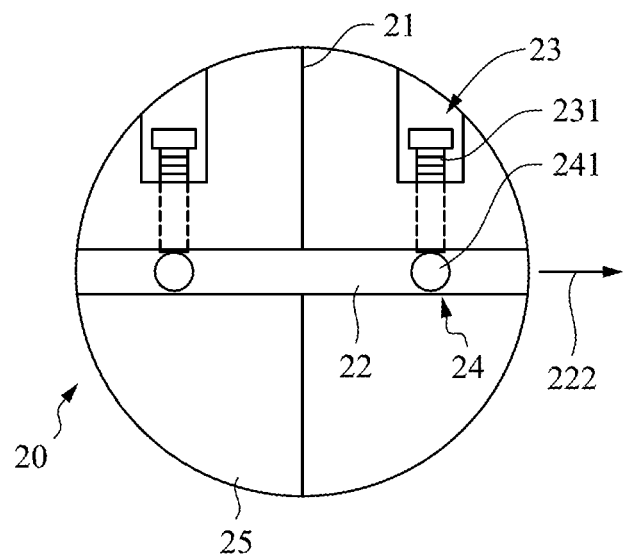
FIG. 3 is a schematic top view of a curved-surface fixing platform in FIG. 2.

In some embodiments, in the locating manner of the to-be-detected point 111, the to-be-detected point 111 is located on a center reference line 21 of the curved-surface fixing platform 20, as shown in FIG. 3.

In some embodiments, the curved-surface fixing platform 20 includes a slot 22 for placing a to-be-detected piece, a locking device 23, and a leveling device 24, and the slot 22 for placing a to-be-detected piece is configured to accommodate the curved surface block 10. The locking device 23 is configured to lock the curved surface block 10 in the slot 22 for placing a to-be-detected piece. The leveling device 24 is configured to keep the to-be-detected point 111 at the horizontal highest point in combination with a fastening force of the locking device 23.

Figure 4:
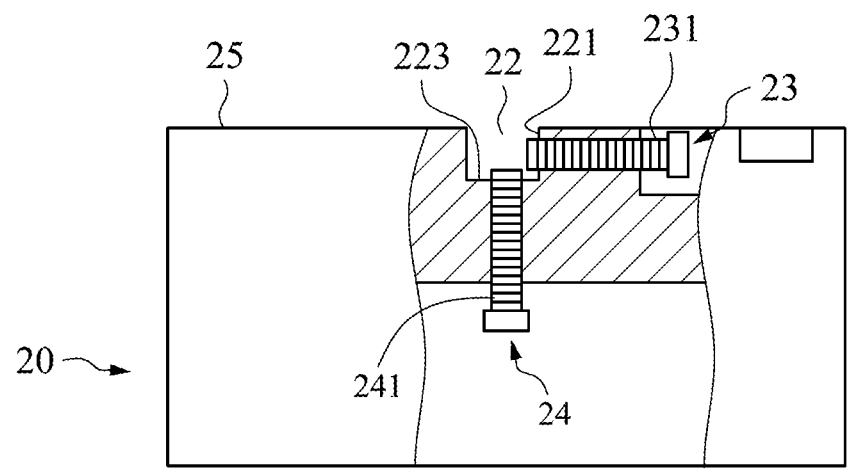
FIG. 4 is a schematic side view of the curved-surface fixing platform in FIG. 2, showing a locking device and a leveling device are operated.

As shown in FIG. 3 and FIG. 4, in some embodiments, the locking device 23 is a screw structure capable of screwing a front end out of or into a side wall 221 of the slot 22 for placing a to-be-detected piece, to butt and fix or release the curved surface block 10.

As shown in FIG. 1, after fixing the curved surface block 10, the curved surface block 10 is protruded out of a top surface 25 of the curved-surface fixing platform 20. In other words, the to-be-detected point 111 of the curved surface block 10 is above the top surface 25 of the curved-surface fixing platform 20.

As shown in FIG. 1 and FIG. 3, the locking device 23 includes multiple screw rods 231. The screw rods 231 are respectively located at two sides of the center reference line 21 of the curved-surface fixing platform 20 for enhancing a stability of fixing the curved surface block 10. In addition, an axial direction 222 of the slot 22 for placing a to-be-detected piece is perpendicular to the center reference line 21 of the curved-surface fixing platform 20.

As shown in FIG. 3 and FIG. 4, the leveling device 24 is a screw structure capable of screwing the front end out of or into the bottom 223 of the slot 22 for placing a to-be-detected piece, to lift up or lower the curved surface block 10. The leveling device 24 includes multiple adjusting rods 241. The adjusting rods 241 are respectively located at two sides of the center reference line 21 of the curved-surface fixing platform 20 for enhancing an adjustment operation of adjusting the to-be-detected point 111 at the horizontal highest point.

The point at which the curvature is highest can be quickly found by designing the slot 22 for placing a to-be-detected piece of the curved-surface fixing platform 20. For example, the curved surface block 10 is placed in parallel inside the slot 22 for placing a to-be-detected piece, the curved surface block 10 is slightly fixed by using the locking device 23, that is, the highest point on the curved surface 11 may be found by using a top surface of the curved-surface fixing platform 20 as a benchmark, and then the curved surface block 10 is lifted up by using the leveling device 24 to lift up the to-be-detected point 111. In this way, a measurement error brought by a portable residual-stress measurement instrument can be reduced, curved surface impact factors can be reduced, geometrical features can be effectively controlled, and a measurement error caused by deviation of a residual stress measurement point on a curved surface can be eliminated.

The residual stress measurement method is applied to the measurement of the residual stress on the to-be-detected curved surface 11 of the curved surface block 10. In addition, in the residual stress measurement method, the instrument 30 is in combination with the $\sin^2 \Psi$ method, so a measuring accuracy of the strain valve is enhanced and a measurement error is decreased.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A residual stress measurement method of a curved surface block, comprising steps of: locating a point at which a to-be-detected curved surface of a curved surface block has a highest curvature as a to-be-detected point; applying an instrument integrating an X-ray light source and a detector, measuring the to-be-detected point by using an X-ray diffraction theory, and analyzing and calculating, in combination with a $\sin^2\Psi$ method, a strain value measured by using the instrument; and calculating, in combination with material property measurement data of the curved surface block, a residual stress of the to-be-detected curved surface by introducing a mathematical expression 1 of a curved surface block residual stress calculation $$\sigma = E\left\{\frac{\varepsilon(h_{b-X})}{h_b} + \left(X - \frac{-h_b^2 + 2_X h_b}{2(h_{b-X})}\right)\kappa\right\} \quad \text{[mathematical expression 1]}$$

wherein σ represents the residual stress, E represents a Young's modulus of the curved surface block, ε represents the strain value measured by using the instrument, $h_b$ represents a thickness of the curved surface block, κ represents a curvature at the highest point of the to-be-detected curved surface, and χ represents a diffraction depth.

2. The residual stress measurement method of the curved surface block of claim 1, wherein a locating manner of the to-be-detected point is a manner in which the curved surface block is fixed on a curved-surface fixing platform in combination with the curved-surface fixing platform, and a position of the to-be-detected point is calibrated to keep the to-be-detected point at a horizontal highest point relative to the curved-surface fixing platform.

3. The residual stress measurement method of the curved surface block of claim 2, wherein before the instrument is in combination with the $\sin^2 \Psi$ method, the instrument is applied to scan for obtaining a phase analysis and to select a phase analysis diffraction peak.

4. The residual stress measurement method of the curved surface block of claim 2, wherein in the locating manner of the to-be-detected point, the to-be-detected point is located on a center reference line of the curved-surface fixing platform.

5. The residual stress measurement method of the curved surface block of claim 4, wherein the curved-surface fixing platform comprises a slot for placing a to-be-detected piece, a locking device, and a leveling device, the slot for placing a to-be-detected piece being configured to accommodate the curved surface block, the locking device being configured to lock the curved surface block in the slot for placing a to-be-detected piece, and the leveling device being configured to keep the to-be-detected point at a horizontal highest point in combination with a fastening force of the locking device.

6. The residual stress measurement method of the curved surface block of claim 5, wherein the locking device is a screw structure capable of screwing a front end out of or into a side wall of the slot for placing a to-be-detected piece, to butt and fix or release the curved surface block.

7. The residual stress measurement method of the curved surface block of claim 6, wherein the locking device includes multiple screw rods, the screw rods are respectively located at two sides of the center reference line of the curved-surface fixing platform.

8. The residual stress measurement method of the curved surface block of claim 5, wherein the leveling device is a screw structure capable of screwing a front end out of or into a bottom of the slot for placing a to-be-detected piece, to lift up or lower the curved surface block.

9. The residual stress measurement method of the curved surface block of claim 5, wherein the leveling device includes multiple adjusting rods, the adjusting rods are respectively located at two sides of the center reference line of the curved-surface fixing platform.

10. The residual stress measurement method of the curved surface block of claim 1, wherein the X-ray light source and the detector are respectively located at two sides relative to the to-be-detected point.

11. The residual stress measurement method of the curved surface block of claim 10, wherein the X-ray light source is fixed.

12. The residual stress measurement method of the curved surface block of claim 10, wherein the X-ray light source is moved along a path, the detector is moved along the path and faces toward an orthogonal direction relative to an incident direction of the X-ray light source.

* * * * *